United States Patent
Maltagliati et al.

(10) Patent No.: US 7,330,511 B2
(45) Date of Patent: Feb. 12, 2008

(54) METHOD AND SYSTEM FOR EMBEDDING DEVICE POSITIONAL DATA IN VIDEO SIGNALS

(75) Inventors: Alan G. Maltagliati, St. Louis, MO (US); James G. Withers, Chesterfield, MO (US); Jesse J. Chounard, II, Ballwin, MO (US)

(73) Assignee: Koplar Interactive Systems International, L.L.C., St. Louis, MO (US)

( * ) Notice: Subject to any disclaimer, the term of this patent is extended or adjusted under 35 U.S.C. 154(b) by 570 days.

(21) Appl. No.: 10/888,292

(22) Filed: Jul. 9, 2004

(65) Prior Publication Data

US 2005/0055156 A1 Mar. 10, 2005

Related U.S. Application Data

(60) Provisional application No. 60/495,902, filed on Aug. 18, 2003.

(51) Int. Cl.
| H04N 7/12 | (2006.01) |
| H04N 11/02 | (2006.01) |
| H04N 11/04 | (2006.01) |
| H04B 1/66 | (2006.01) |

(52) U.S. Cl. ................................. 375/240.26
(58) Field of Classification Search ............ None
See application file for complete search history.

(56) References Cited

U.S. PATENT DOCUMENTS

| 4,807,031 A | 2/1989 | Broughton et al. |
| 5,443,227 A | 8/1995 | Hsu |
| 5,467,274 A | 11/1995 | Vax |
| 6,023,241 A | 2/2000 | Clapper |
| 6,094,228 A | 7/2000 | Ciardullo et al. |
| 6,188,939 B1 | 2/2001 | Morgan et al. |
| 6,229,572 B1 | 5/2001 | Ciardullo et al. |
| 6,472,771 B1 | 10/2002 | Frese et al. |

(Continued)

FOREIGN PATENT DOCUMENTS

JP  2002-330377  11/2002

(Continued)

OTHER PUBLICATIONS

*Written Opinion and Search Report for International Application* No. PCT/US04/26855, (Nov. 27, 2006), 8 pgs.

(Continued)

*Primary Examiner*—Nhon Diep
(74) *Attorney, Agent, or Firm*—Schwegman, Lundberg & Woessner, P.A.

(57) ABSTRACT

A system for embedding positional data (20) in a video signal (18), the system having a mobile object (4), a positioning receiver (10) associated with the mobile object (4) for obtaining positional data (20) on the mobile object (4) from a plurality of positioning satellites (6), a video camera (16) associated with the mobile object (4) for creating the video signal (18), an encoder (12) for receiving the video signal (18) from the video camera (16) and the positional data (20) from the positioning receiver (10) and modulating the positional data (20) within the video signal (18) thereby creating a modulated video signal (22), and a video recorder (15) associated with the mobile object (4) for storing the modulated video signal (22) on a recording medium (14).

23 Claims, 11 Drawing Sheets

U.S. PATENT DOCUMENTS

| | | |
|---|---|---|
| 6,530,782 B2 | 3/2003 | Fouse et al. |
| 6,661,905 B1 | 12/2003 | Chupp et al. |
| 6,681,160 B2 | 1/2004 | Bidaud |
| 6,720,879 B2 | 4/2004 | Edwards |
| 6,741,790 B1 | 5/2004 | Burgess |
| 7,155,336 B2 * | 12/2006 | Dorfman et al. ............ 701/200 |
| 2002/0016674 A1 * | 2/2002 | Rudow et al. ............. 701/215 |
| 2002/0045987 A1 * | 4/2002 | Ohata et al. ................ 701/213 |
| 2002/0112250 A1 | 8/2002 | Koplar et al. |
| 2002/0183102 A1 | 12/2002 | Withers et al. |
| 2003/0087635 A1 * | 5/2003 | Sheffield ................... 455/423 |
| 2004/0117856 A1 | 6/2004 | Barsoum et al. |

FOREIGN PATENT DOCUMENTS

| | | | |
|---|---|---|---|
| WO | WO-2005036867 A2 | 4/2005 | |
| WO | WO-2005036867 A3 | 4/2005 | |

OTHER PUBLICATIONS

"JP2002-330377 English Translation", 38 pgs.

"International Preliminary Report on Patentability Jan. 18, 2007".

"International Search Report and Written Opinion Nov. 27, 2006".

* cited by examiner

POSITIONING SYSTEM COMPONENTS

EMBEDDING COMPONENTS

POSITIONING RECEIVER   FIG. 6

METHOD AND SYSTEM FOR EMBEDDING DEVICE POSITIONAL DATA IN VIDEO SIGNALS

CROSS-REFERENCE TO RELATED APPLICATION

This application claims the benefit of United States Provisional Patent Application entitled "A Method and System for Embedding Device Positional Data in Video Signals", Ser. No.: 60/495,902, Filed 18 Aug. 2003 by Alan G. Maltagliati, James G. Withers, Jesse J. Chounard II and Edward J. Koplar, which is herein incorporated by reference and continued preservation of which is requested.

BACKGROUND OF THE INVENTION

The present invention relates to a system for embedding device positional data in video signals, and more particularly to a system for encoding positional data for a mobile object in a video signal for subsequent synchronized reproduction of the video signal and the positional data.

Various methods exist in the art for transmitting data along with video signals, wherein the data is received and then used by the viewer of the video signals. Several of these methods transmit data in the video signals by replacing active portions of the video signal with data, such that users who view the video signal on their display devices will see the effect of the data in the form of an icon, dot or other visual image or disturbance in the picture. Other methods transmit data in non-viewable scan lines of the video signal, such as in the vertical blanking interval (VBI). However, these scan lines may already contain other data, such as a secondary audio program and are prone to being stripped by programming operators prior to broadcast.

Another method for transmitting auxiliary data in video signals is described in U.S. Pat. No. 4,807,031 to Broughton et al. ("Broughton") entitled "Interactive Video Method and Apparatus", which relates generally to in-band video broadcasting of commands and other encoded information to interactive devices and is incorporated by reference herein. The invention described therein relates generally to interactive educational and entertainment systems, and is described in one embodiment in the context of television program control of toys located where there is a television receiver, as within a residence.

To encode control data capable of providing a benefit to a user, Broughton discloses a novel method of luminance or chrominance modulation of a video signal that creates a composite video signal, wherein the video signal is modulated with control data. The novel modulation method alternately raises and lowers the luminance/chrominance of adjacent horizontal scan lines to create a video subcarrier that contains the control data.

In Broughton, the video signal is not being replaced with other data, nor is the data being added as a separate signal along with the video signal. Rather, the video signal itself is modulated to carry the control data. Therefore, the control data is a part of, or contained within, the video signal and yet is imperceptible to the human eye. The encoding method also includes preview and remove circuitry to ensure suitability or the presence of data encoding and removal of data encoding, respectively.

The control data is transmitted either by television broadcast means, or by pre-recorded video players that are connected to a video display. The control data is then received by the video display where at least one video field of the video display is modulated by control data. The control data is then detected with either opto-electronic or radio frequency (RF) detection means that discriminate between the program material and the control data to detect the control data. The detected control data is further reproduced so that the control data can be used with an interactive device.

Improvements on the method of modulation described in Broughton are described in U.S. Pat. No. 6,094,228 to Ciardullo et al. and U.S. Pat. No. 6,229,572 to Ciardullo et al. (referred to collectively herein as "Ciardullo"). Both Ciardullo patents describe improved methods of modulation wherein control data is inserted on the visual portion of a video signal by changing the luminance of paired lines in opposite directions, thus allowing larger amounts of data to be modulated in a signal. Broughton and Ciardullo, which are owned by the assignee of the present invention, are incorporated by reference herein.

Prior efforts by the assignee of the present patent application also include U.S. patent application entitled "Interactive Optical Cards and Other Hand-Held Devices with Increased Connectivity", Ser. No. 09/489,373, filed Jan. 21, 2000, of Edward J. Koplar and Daniel A. Ciardullo (referred to hereinafter as "Koplar I"), which is incorporated by reference herein. Koplar I relates to various hand-held device embodiments and methods of use involving the reception of auxiliary data (i.e., control data) from a signal source and providing the user of the hand-held device with various promotional opportunities, such as interactive advertising and gaming, as a result of receiving the auxiliary data.

Another patent application by the assignees of the present invention is U.S. Patent Application entitled "Universal Methods and Device for Hand-Held Promotional Opportunities", Ser. No. 09/829,223, filed Apr. 9, 2001, of Edward J. Koplar, Daniel A. Ciardullo, James G. Withers and Christopher E. Chupp (referred to hereinafter as "Koplar II"), which is incorporated by reference herein. Koplar II describes additional methods of providing auxiliary data to hand-held devices for the purpose of providing a user of the hand-held device with promotional opportunities, as well as apparatuses for use with same.

Yet another patent application by the assignees of the present invention is U.S. Patent Application entitled "RBDS Method and Device for Processing Promotional Opportunities", Ser. No. 10/126,770, filed on Apr. 19, 2002, of James G. Withers and Alan G. Maltagliati (referred to hereinafter as "Withers I"), which is incorporated by reference herein. Withers I describes further improvements to Koplar I and Koplar II including the transmission of auxiliary data to a hand-held device by use of the RBDS system.

Still another patent application by the assignees of the present invention is U.S. patent application entitled "Method and Apparatus for Modulating a Video Signal With Data", Ser. No. 10/676,940, filed on Oct. 1, 2003, of Yousri H. Barsoum, Alan G. Maltagliati, Daniel A. Ciardullo and Christopher E. Chupp (the application being herein referred to as "Barsoum"), which is incorporated by reference herein. Barsoum describes the use of a memory card coupled to a slotted hand-held device for receiving video signals by use of the memory card, transmitting the signals from the card to the slotted hand-held device, decoding auxiliary data from the video signals on the slotted hand-held device and providing the user of the slotted hand-held device with a benefit from the reception of the auxiliary data. Barsoum also describes a method of improving the reliability and speed of the transmission and reception of auxiliary data by storing data in video frames split into multiple fields and encoding complementary data bits in each field.

Still another patent application by the assignees of the present invention is U.S. Patent Application entitled "A Method And System Of Transmitting Auxiliary Data From A Digital Display Device", Ser. No. 10/817,109, filed on Apr. 2, 2004, of James G. Withers, Yousri H. Barsoum, Edward J. Koplar and Michael C. Reynolds (the application being herein termed "Withers II"), which is incorporated by reference herein. Withers II describes several methods and apparatus for modulating auxiliary data for use on digital display devices.

The aforementioned improvements to Broughton along with other technology that encodes data in video signals have been disclosed for use with a variety of applications. However, to date video signals have not been encoded with data relating to the location of an object.

Several methods exist in the art for determining the location of objects on the earth or relative to other objects. For example, police officers may triangulate the signal of a distress cellular telephone call between several cellular phone towers to determine the location of the caller. Also, an underground invisible fence emits a field that causes a dog that wears a collar with a receiver to receive a warning beep and then a correction (i.e., a shock) via their collar depending on the dogs distance from the field. However, neither of these technologies provided for a divergent and wide-scale use in a variety of consumer applications.

The Global Positioning System (GPS) is a satellite-based navigation system owned and operated by the U.S. Department of Defense (DOD). It comprises a network of 24 satellites that orbit the earth and make it possible for people with ground receivers to pinpoint their geographical location. The 24 satellites orbit the earth in a "constellation" arrangement and are approximately 11,000 miles above the earth. GPS was originally intended for military applications, but the DOD made the GPS system freely available for public use.

GPS satellites circle the earth twice a day and transmit signals with positioning information back to earth, with four satellites always visible from the horizon. GPS receivers contain electronics that "triangulate" the position of a GPS receiver by receiving the signals from at least three satellites. The result is a geographical position (i.e., longitude, latitude and altitude) that may be used with a display to show the receiver's position on a map or for other purposes.

At the present time, GPS receivers are most typically used as an optional feature in many automobiles and may also be added aftermarket. They are also widely used in maritime and aircraft positioning and navigation and military uses. Automotive GPS receivers, for example, are capable of not only determining an automobile's current location, but also of providing driving directions and a real-time map from the current location to a desired location. GPS receivers are also available for hand-held use by hikers, explorers and fisherman. Because of affordability and availability of the GPS receivers, they are becoming more desirable and widely used by consumers.

The GPS system is especially valuable to the military, as it in provides much needed location information in a variety of applications including tracking friendly and non-friendly vehicles and troops, targeting locations, and for other general mapping and locating purposes. Military uses may also retain the data received from the GPS receiver for use with compiling locations for later use such as with reconstructing scenarios for future training exercises or internal investigations.

The military also records video signals by use of video cameras for various purposes including to verify completion of various tasks, track locations, and provide news organizations with footage for newscasts. Presently, the GPS data and the video signals are retained on separate storage devices. Typically, GPS data and video signals are presented in an unsynchronized manner as it is difficult to later associate GPS data with a video signal because of the enormous amount of video signals and data that are recorded during conflicts.

Law enforcement personnel also utilize GPS receivers in their automobiles to obtain directions to locations received from dispatch. Frequently, such personnel record video signals to demonstrate to judges and juries that they acted within the law, as when they arrest a suspect or follow a suspicious automobile. However, these recorded video signals may still be subject to challenge based on factors including timing, location, and authenticity of the source video signal.

There is a need in the art to simultaneously record positional data and video signals in a single recording medium such that playback of the medium will reproduce synchronized positional data and video signals, whereby the video signals must not be altered to reproduce the positional data.

SUMMARY OF THE INVENTION

In brief summary, the present invention overcomes and substantially alleviates the deficiencies in the prior art by providing a method for embedding synchronized positional data in a video signal for subsequent playback. The positioning system first comprises a mobile object connected to a positioning receiver and a video camera. The positioning system may optionally comprise one or more auxiliary sources, each of which measure an attribute of the mobile object.

The positioning receiver obtains positioning information regarding the mobile object from one or more positioning satellites. The recording by the video camera of the recording subject produces the video signal, which is provided to the encoder. The auxiliary source is connected to and obtains information regarding mobile object and provides the information to the encoder in the form of supplemental data.

The encoder encodes the positional data and the supplemental data in the video signal thereby creating a modulated video signal. Thereafter, the modulated video signal is stored on the recording medium by the video recorder.

The modulated video signal is reproduced from the recording medium by a playback unit. The decoder obtains the positional data and the optional supplemental data from the modulated video signal. Thereafter, the display device presents the modulated video signal while the presentation device synchronously presents the positional data and the supplemental device presents the supplemental data if present.

Additional advantages and novel features of the invention will be set forth in the description which follows, and will become apparent to those skilled in the art upon examination of the following more detailed description and drawings in which like elements of the invention are similarly numbered throughout.

DETAILED DESCRIPTION OF THE INVENTION

Figure 1:
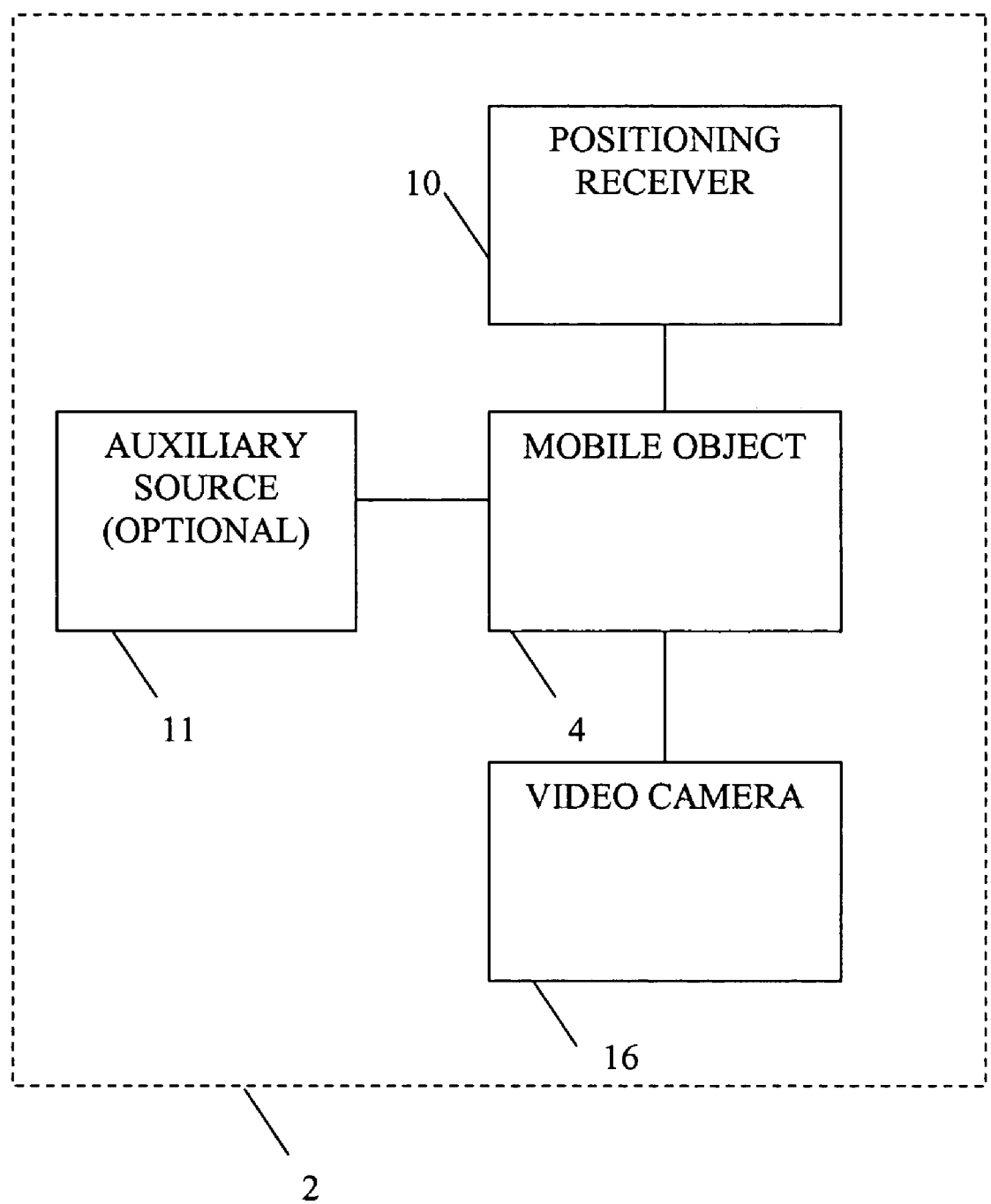
FIG. 1 is a block diagram of the positioning system components of the present invention.

Referring to the drawings, the preferred embodiment of a system for synchronously embedding positional data of a mobile object in a video signal for subsequent playback of the video signal and positional data of the present invention is illustrated in FIGS. 1-11.

Referring to FIG. 1, a positioning system 2 is shown to comprise a mobile object 4 connected to a positioning receiver 10 and a video camera 16. Mobile object 4 is an object whose physical location is desirous of being altered and tracked such as a vehicle, camcorder, train, tank, watercraft, airplane or missile. Positioning receiver 10 is a device that is capable of determining the geographic location of mobile object 10 as is described in greater detail below. Video camera 16 is a portable video recorder that by use of a lens and other electronics converts optical signals into video signals may be controlled by a user, in a fixed position on mobile object 4, or otherwise controlled by mobile object 4. Positioning system 2 may optionally comprise one or more auxiliary sources 11, each of which measure an attribute of mobile object 4 as is described in greater detail below.

Figure 2:
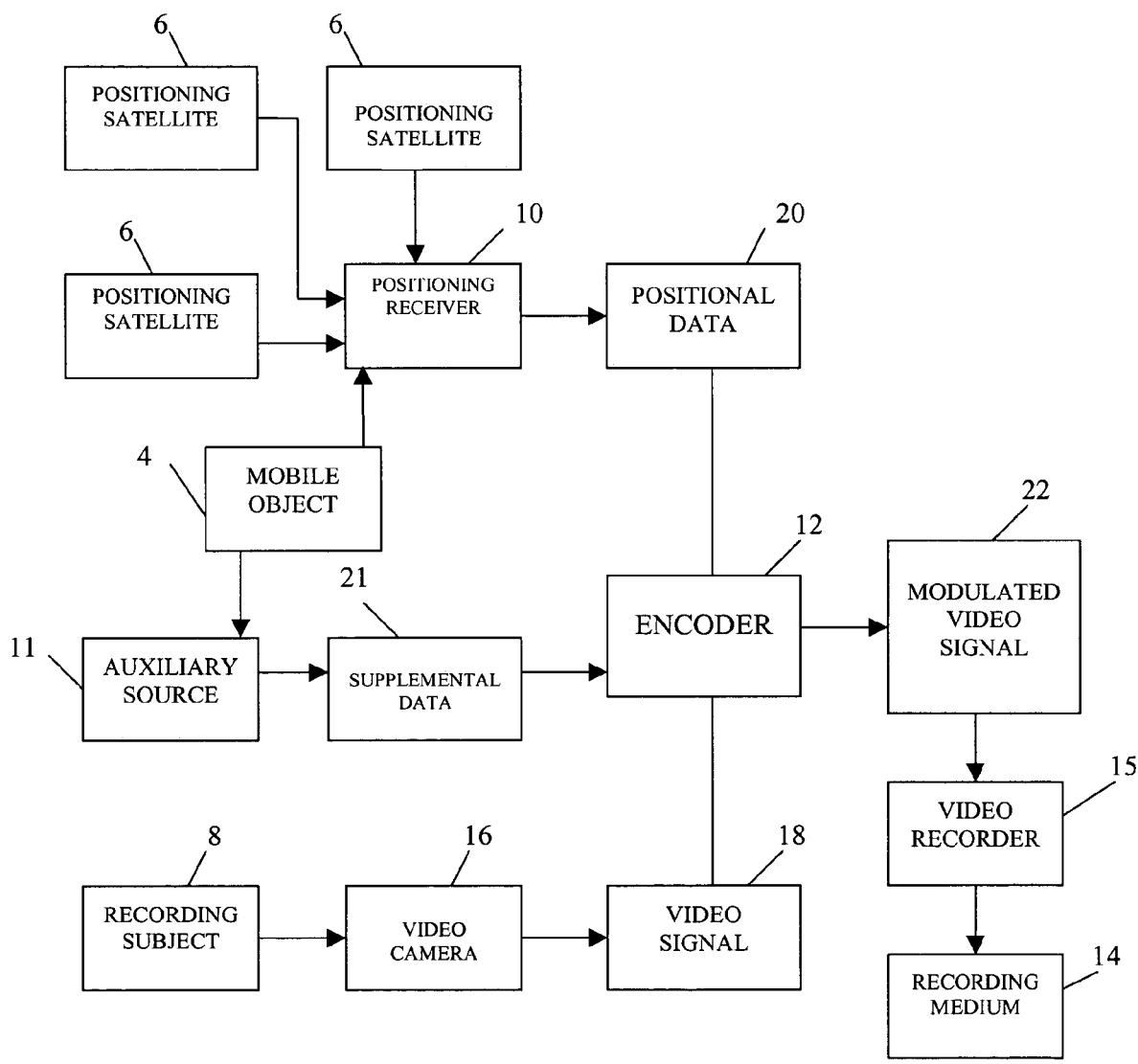
FIG. 2 is a block diagram of the embedding components of the present invention.

Referring to FIG. 2, the embedding components of the present invention first comprise positioning receiver 10 obtaining positioning information regarding mobile object 4 from one or more positioning satellites 6. In the preferred embodiment, positioning receiver 10 utilizes the positioning information to calculate its location (i.e., the location of mobile object 4) in the form of positional data 20 received. Positional data 20 is preferably GPS location data comprising latitude and longitude, but alternatively may be in other useful forms including latitude, longitude and altitude. Positioning satellites 6 are preferably GPS satellites that provide positioning information, but other pluralities of objects that when used collectively provide positioning information are also felt to fall within the present invention including cellular phone towers. Positioning receiver 10 is preferably a portable GPS receiver as will be known in the art of electronic tracking devices, but may also be other devices that derive positional data 20. After calculation, positional data 20 is provided to encoder 12.

The recording by video camera 16 of recording subject 8 produces video signal 18, which is provided to encoder 12. Recording subject 8 is any matter of a perceivable size and color that is capable of being recorded by video camera 16 including terrain, objects and people.

Auxiliary source 11 is connected to and obtains information regarding mobile object 4 and provides the information to encoder 12 in the form of supplemental data 21. The process of one or more auxiliary sources 11 each providing supplementary data 21 to encoder 12 is described in greater detail below.

Encoder 12, as described in greater detail below, encodes positional data 20 and optional supplemental data 21 in video signal 18 thereby creating a modulated video signal 22. Thereafter, modulated video signal 22 is stored on recording medium 14 by video recorder 15. Preferably, recording medium 14 is a standard VHS tape and video recorder 15 is a standard VHS tape recorder. However, it should be appreciated in the art of video recording that alternative recording medium 14 and video recorder 15 may be used in combination, such as a digital versatile disc (DVD) and a DVD recorder. In addition, modulated video signal 22 may alternatively be remotely broadcast to video recorder 15 or directly to playback unit 17 (as described below).

In an alternate embodiment of the present invention, video camera 16 and video recorder 15 are combined into a single unit, such that the combined single unit still utilizes an external positioning receiver 12, optional one or more external auxiliary sources 11, and encoder 12.

In yet a further embodiment of the present invention, video camera 16, video recorder 15 and positioning receiver 10 are combined into a single unit, such that the combined single unit still utilizes an external optional one or more external auxiliary sources 11 and encoder 12.

In still another embodiment of the present invention, video camera 16, positioning receiver 10 and encoder 12 are combined together as a single unit. In addition, the alternate embodiment may further include video recorder 15.

Figure 3:
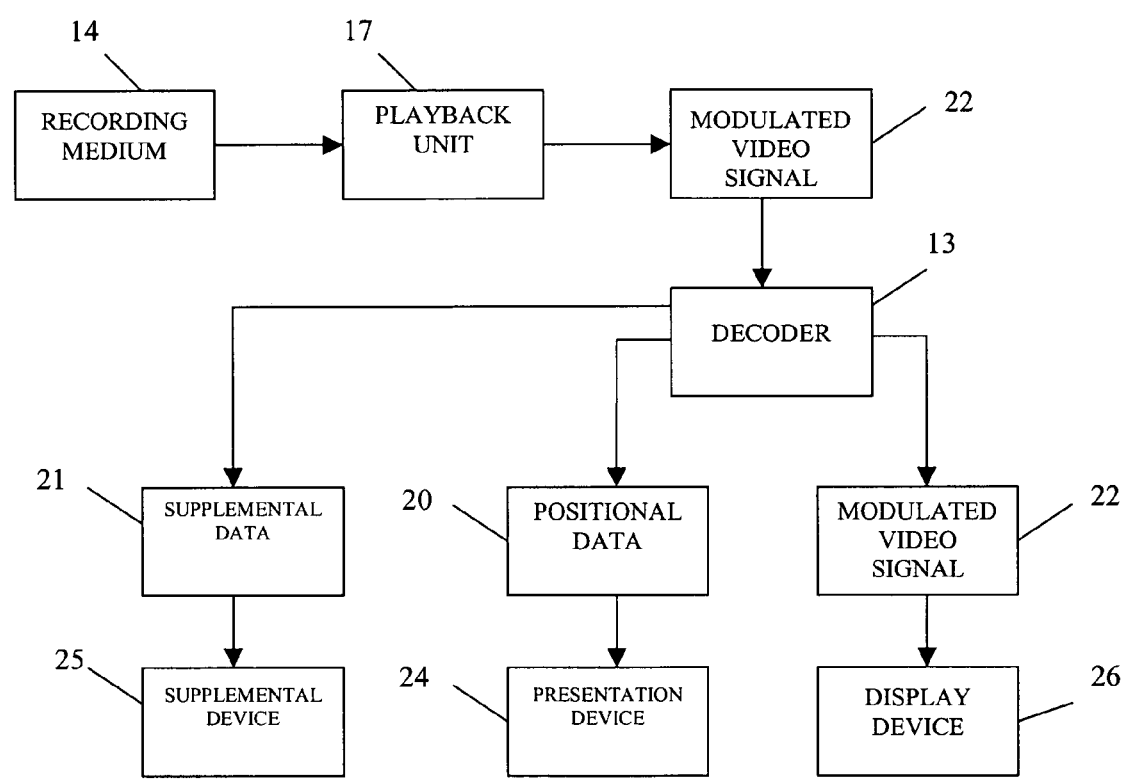
FIG. 3 is a block diagram of the decoding components of the present invention.

Referring to FIG. 3, modulated video signal 22 is reproduced from recording medium 14 for a user by playback unit 17. Playback unit 17 is preferably a VHS tape player, but may vary depending on the video recorder 15 and recording medium 14 used.

Decoder 13 obtains positional data 20 and optional supplemental data 21 from modulated video signal 22. Thereafter, display device 26 presents modulated video signal 22 while presentation device 24 synchronously presents positional data 20 and supplemental device 25 presents supplemental data 21. Presentation device 24 and supplemental device 25 are preferably combined into a single computer or computer-like device running a computer program that generates a map depicting the location of mobile object 4 at the time the modulated video signal 22 was recorded along with the supplementary information. It should be appreciated that display device 26 may be combined with presentation device 24 and/or supplemental device 25, such as by use of a computer with video capture card.

Figure 4:
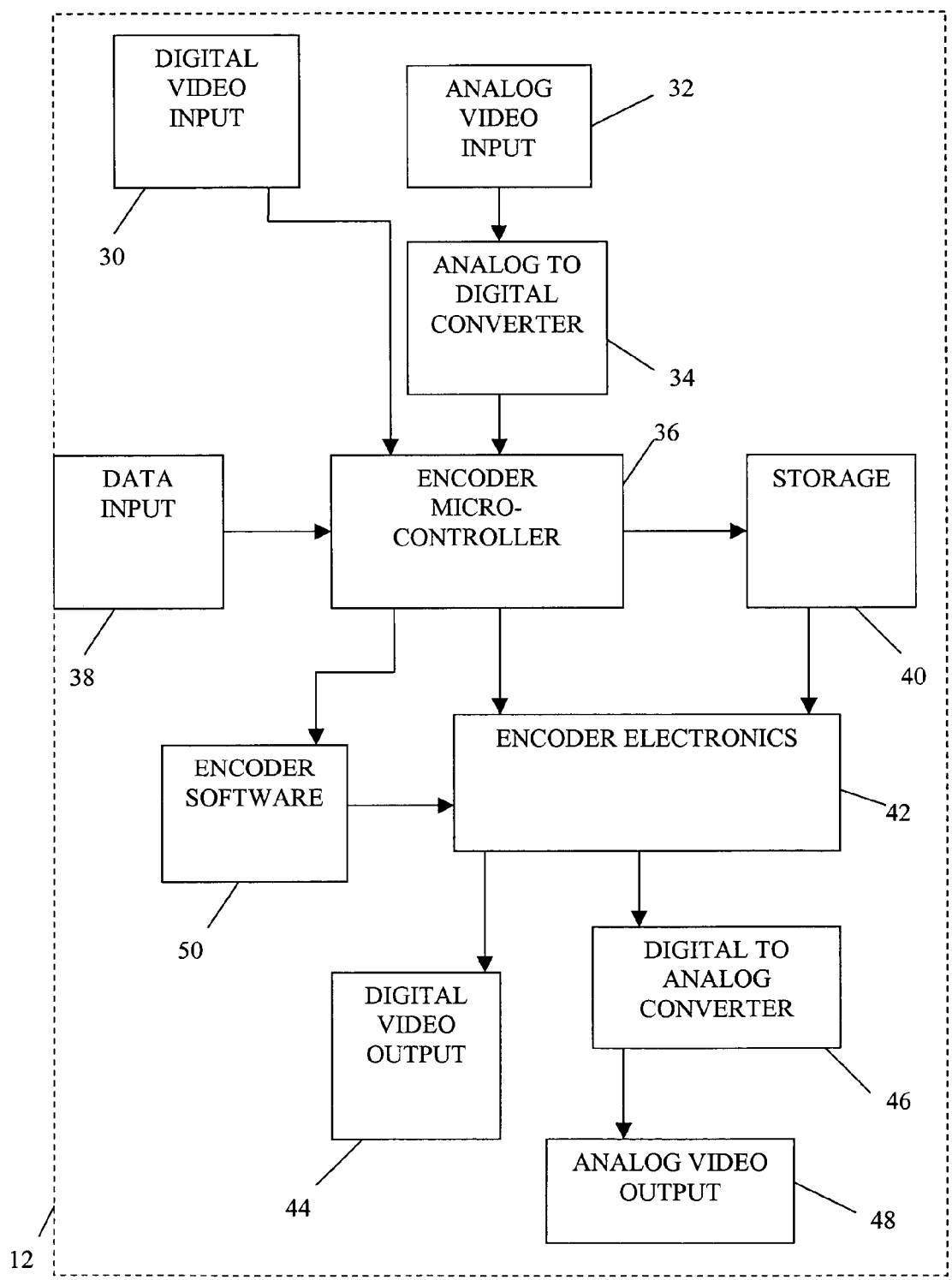
FIG. 4 is a block diagram of an encoder of the present invention.

Referring to FIG. 4, the preferred embodiment of encoder 12 is shown to first comprise a digital video input 30 that is capable of receiving video signal 18 from signal source 10 and passing it to encoder micro-controller 36. However, encoder 12 may receive an analog video signal 18 via analog video input 32 and analog to digital converter 34. Analog to digital converter 34 digitizes the analog video signal 18 according to known techniques such that it may be provided to encoder micro-controller 36 for use with the present invention.

Encoder micro-controller 36 is electronically connected to one or more data inputs 38. Data input 38 receives positional data 20 from positioning receiver 10, and when supplemental data 21 is present additional data inputs 38 from auxiliary source 11.

When encoder micro-controller 36 receives information from one or more data inputs 38 and video signal 18, software 50 manages further operation of encoder 12 and directs encoder micro-controller 36 to store the chrominance information (and/or luminance information as desired) of video signal 18 in storage 40. Storage 40 has the capacity to hold and retain signals (e.g., frames of video signal 18 and corresponding audio signals) in an electromagnetic form for access by encoder micro-controller 36. Storage 40 may be primary storage and/or secondary storage, and include memory and hard disk drive.

Encoder electronics 42 at the direction of software 50 and encoder micro-controller 36 use the methods of the present invention as will be described in greater detail below to modulate positional data 20 and supplemental data 21 into the luminance of video signal 18 thereby creating modulated video signal 22. The resulting modulated video signal 22 is then sent digitally from encoder 12 by digital video output 44, or in analog form by converting the resulting digital signal with digital to analog converter 46 and outputting modulated video signal 22 by analog video output 48. However, it should be appreciated that encoder 12 (and decoder 13 as described below) need not comprise both digital video input 30 and digital video output 44 in combination with analog video input 32 and analog video output 48, and the one selection of inputs and outputs may be selected for encoder 13.

Encoder micro-controller 36 may consist of more than one processor and/or microprocessor to manage the various processing and input/output of the present invention, but preferably consists of a single processor. Moreover, the specific electronics and software used by encoder 12 may differ when its technology is included in a pre-existing device (e.g., built into video camera 16) such as opposed to a stand alone device custom device. Encoder 12 may comprise varying degrees of hardware and software, as various components may interchangeably be used.

Figure 5:
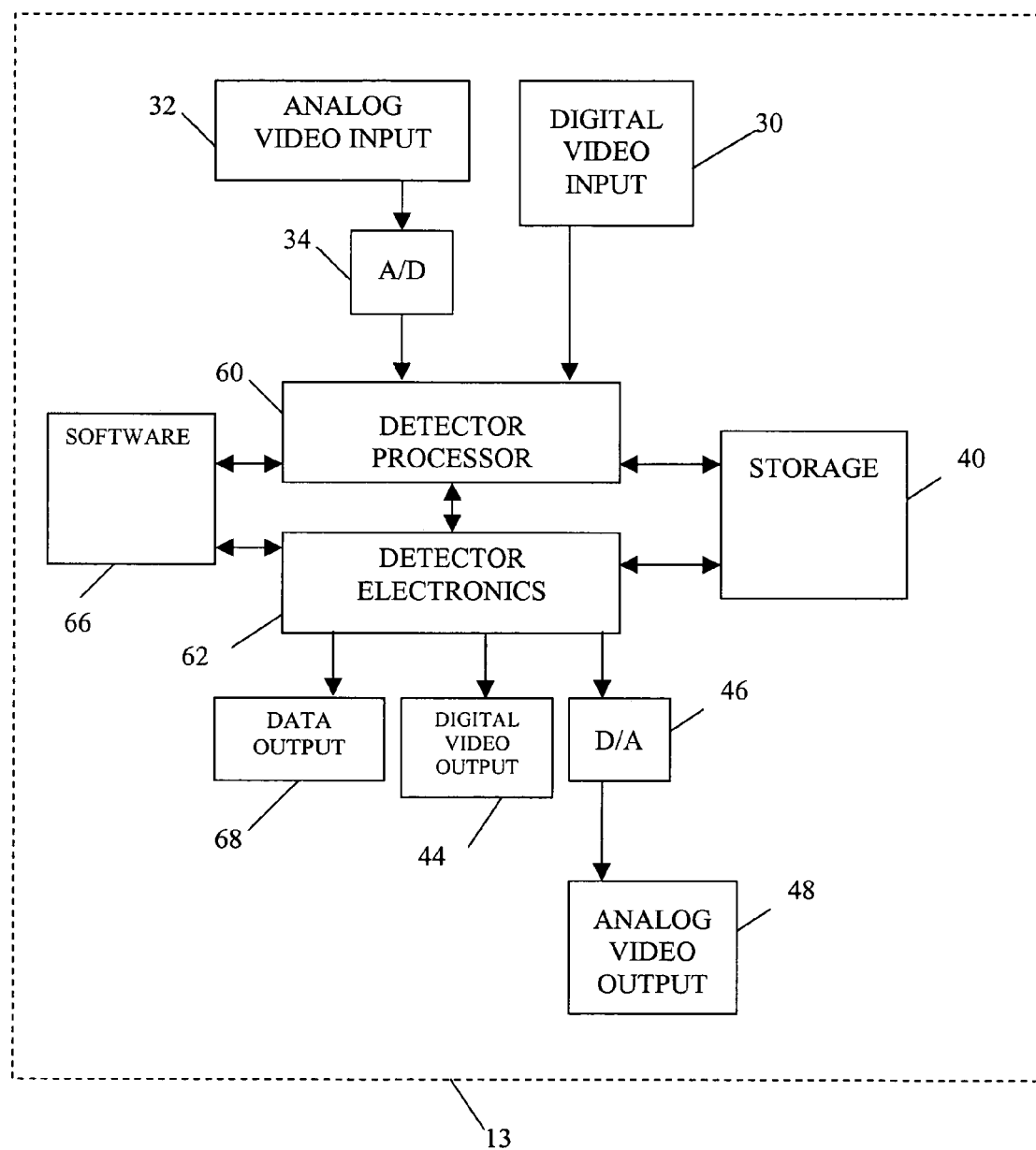
FIG. 5 is a block diagram of a decoder of the present invention.

Referring to FIG. 5, decoder 13 receives modulated video signal 22 by analog video input 32 when modulated video signal 22 is analog, and by digital video input 30 when modulated video signal 22 is digital. Digital video input 30 directly passes modulated video signal 22 to decoder processor 60, while analog video input 32 digitizes modulated video signal 22 by use of analog to digital converter 34 before passing modulated video signal 22 to decoder processor 60.

In the preferred embodiment, decoder processor 60 stores the chrominance of modulated video signal 22 in storage 40 while decoder electronics 62 detects scan lines or portions of modulated video signal 22 thereof that have increased or decreased intensity. The preferred embodiment of the decoding scheme used with the present invention is described below.

Positional data 20 is transferred from decoder 13 to signaled device 24 by a data output 68, and optional supplemental data 21 is transferred from one or more additional data outputs 68 to one or more supplemental device 25. Decoder 13 also outputs modulated video signal 22 in digital format via digital video output 44, and modulated video signal 22 in analog format by first converting signal 22 from the digital to analog format by use of digital to analog converter 46, and then outputting signal 22 via analog video output 48.

Figure 6:
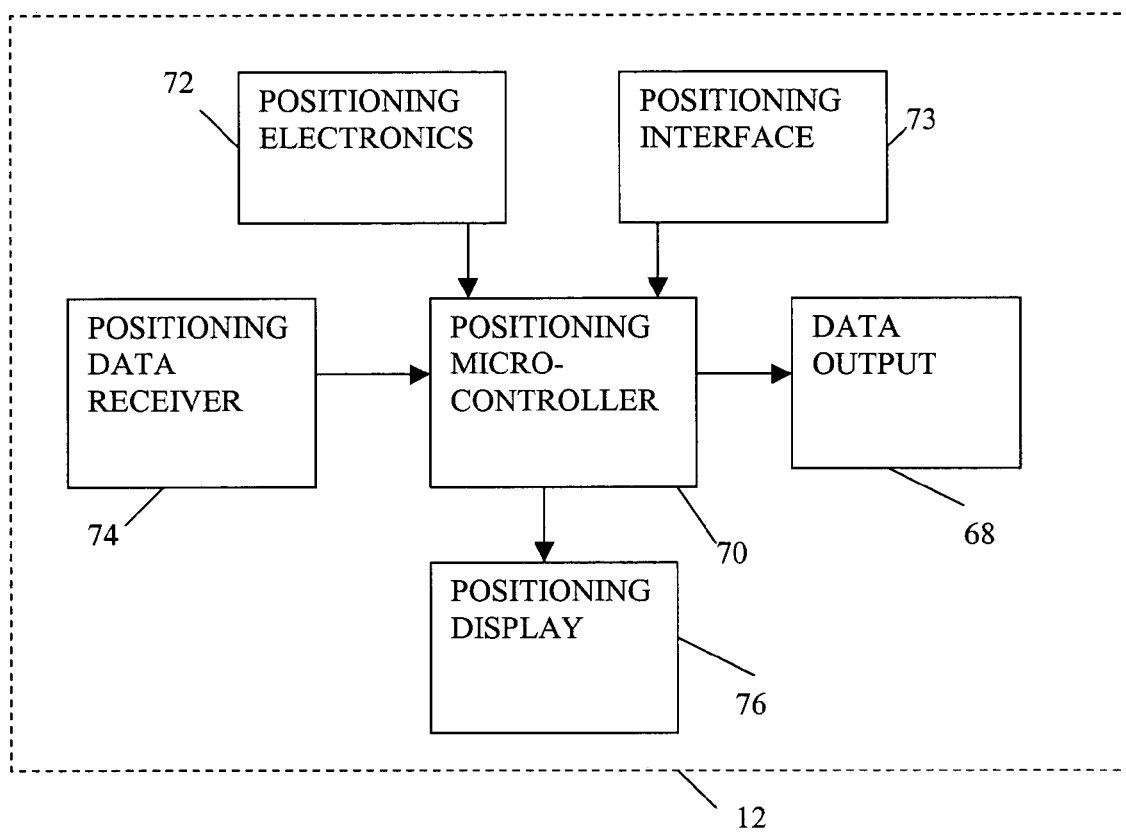
FIG. 6 is a block diagram of a positioning receiver of the present invention.

Referring to FIG. 6, the preferred embodiment of positioning receiver 10 may be observed to comprise a positioning micro-controller 70, which directs the operation of positional receiver 10. Positioning electronics 72 is electronically coupled to positioning micro-controller 70 and contains circuitry necessary to implement positioning receiver 10. Positioning data receiver 74 is electrically coupled to positioning micro-controller 70 and receives positioning information from positioning satellites 6. Data output 68 outputs positional data 20 in computer readable format via a serial port or other data communication output. Optional positioning display 76 is coupled to positioning micro-controller 70 and visually presents to a user of positional data receiver 12 the location of positioning receiver 10 on a map. Optional positioning interface 73 is coupled to positioning micro-controller 70 and provides controls that enable a user to interact with positioning receiver 10. Preferably, positioning receiver 10 is a GPS receiver.

Figure 7:
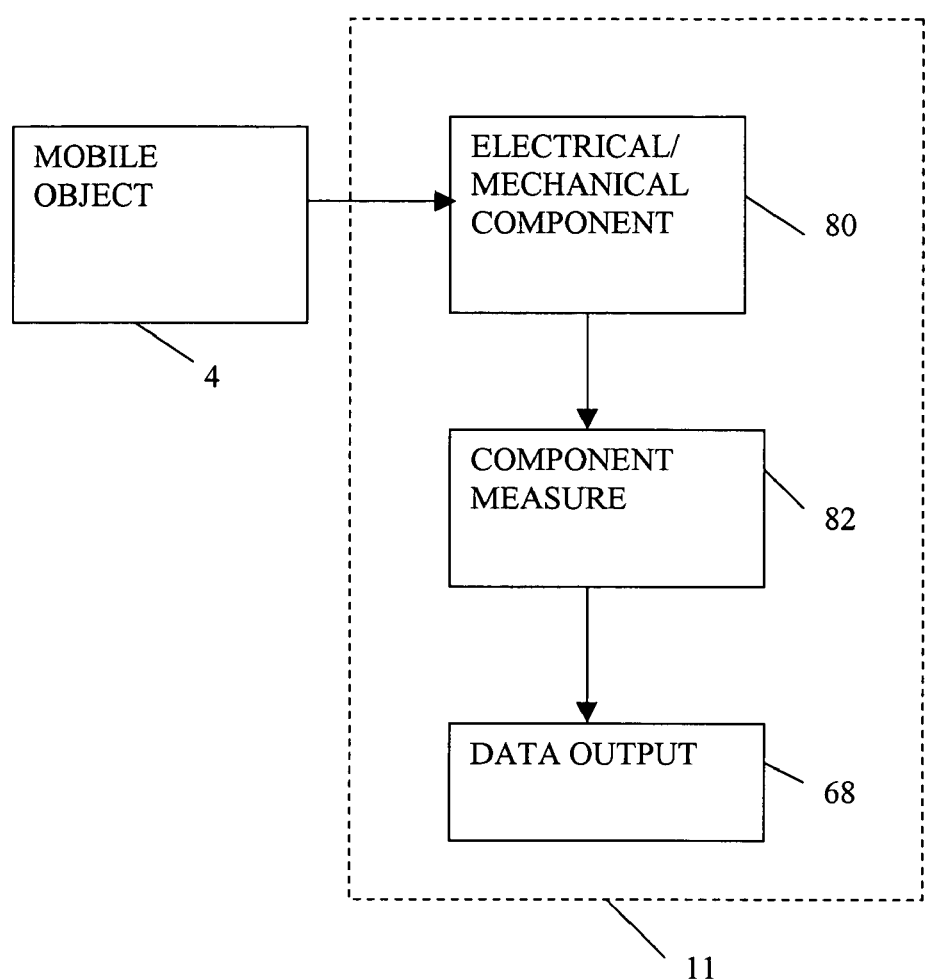
FIG. 7 is a block diagram of an auxiliary source of the present invention.

Referring to FIG. 7, auxiliary source 11 comprises an electromechanical component 80 that has an attribute that is capable of being measured as will be further describe below. Component measure 82 is either physically or electronically coupled to electromechanical component 80 to obtain a measurement of an attribute of electromechanical component 80, such as the temperature of an engine, the speed of a vehicle, or the rotation of a camera lens. Data output 68 is coupled to component measure 82 and outputs supplemental data 21 to encoder 12.

Figure 8:
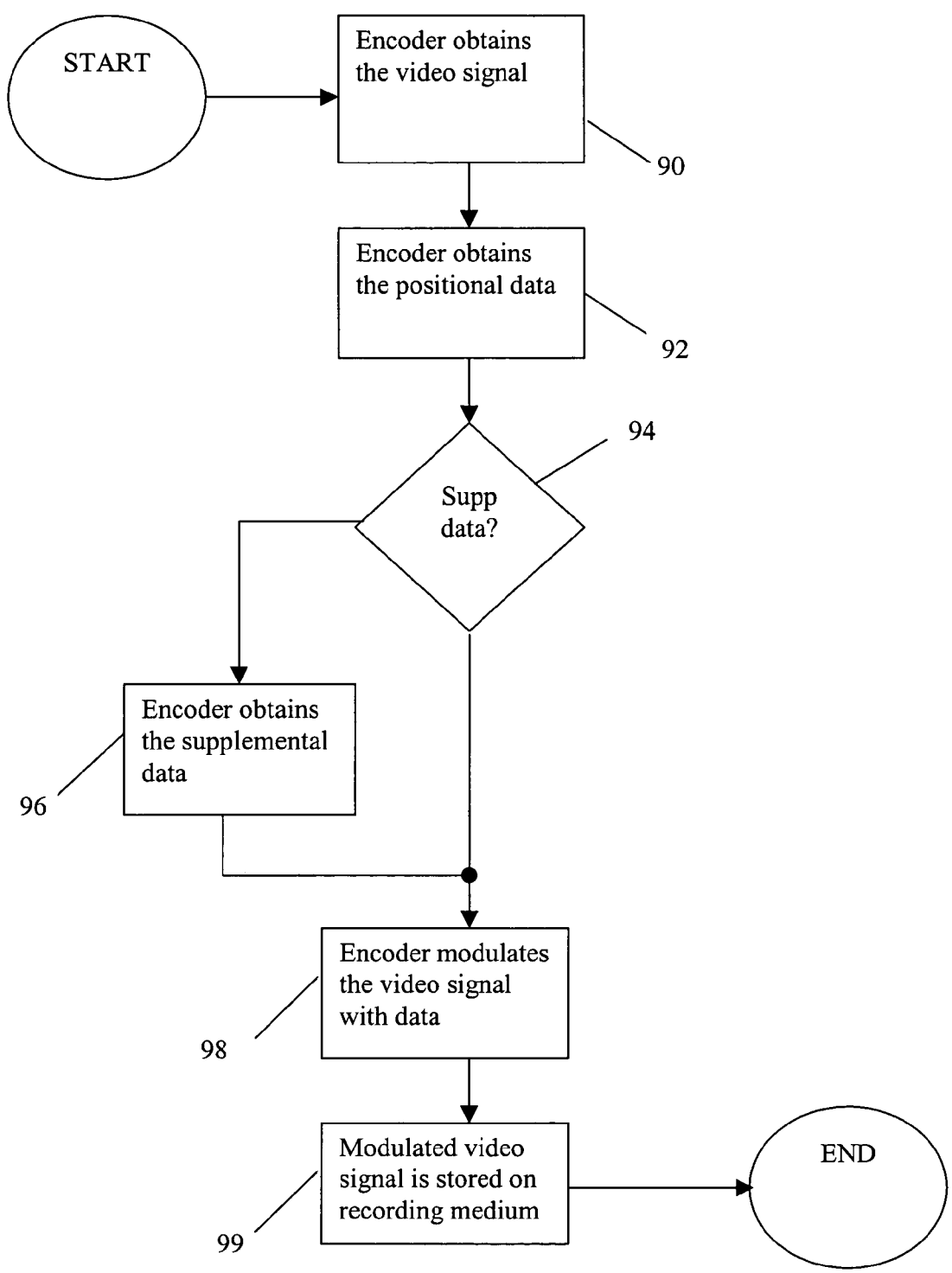
FIG. 8 is a flowchart of the encoding method of the present invention.

Referring to FIG. 8, the method for data encoding (i.e., embedding) comprises a first step 90 where encoder 12 obtains video signal 18 depicting recording subject 8 from video camera 16. Thereafter, encoder 12 at step 92 obtains the positional data 20 from positioning receiver 10.

Encoder 12 at decision point 94 determines whether supplemental data 21 is available to be provided to encoder 12. If yes, encoder 12 proceeds to step 96 to obtain supplemental data 21 from auxiliary source 11. If no, encoder 12 proceeds directly to step 98.

Encoder 12 at step 98 modulates video signal 18 with positional data 20 and supplemental data 21 when present as described in greater detail below. After modulation, modulated video signal 22 is stored on recording medium 14 by video recorder 15.

Figure 9:
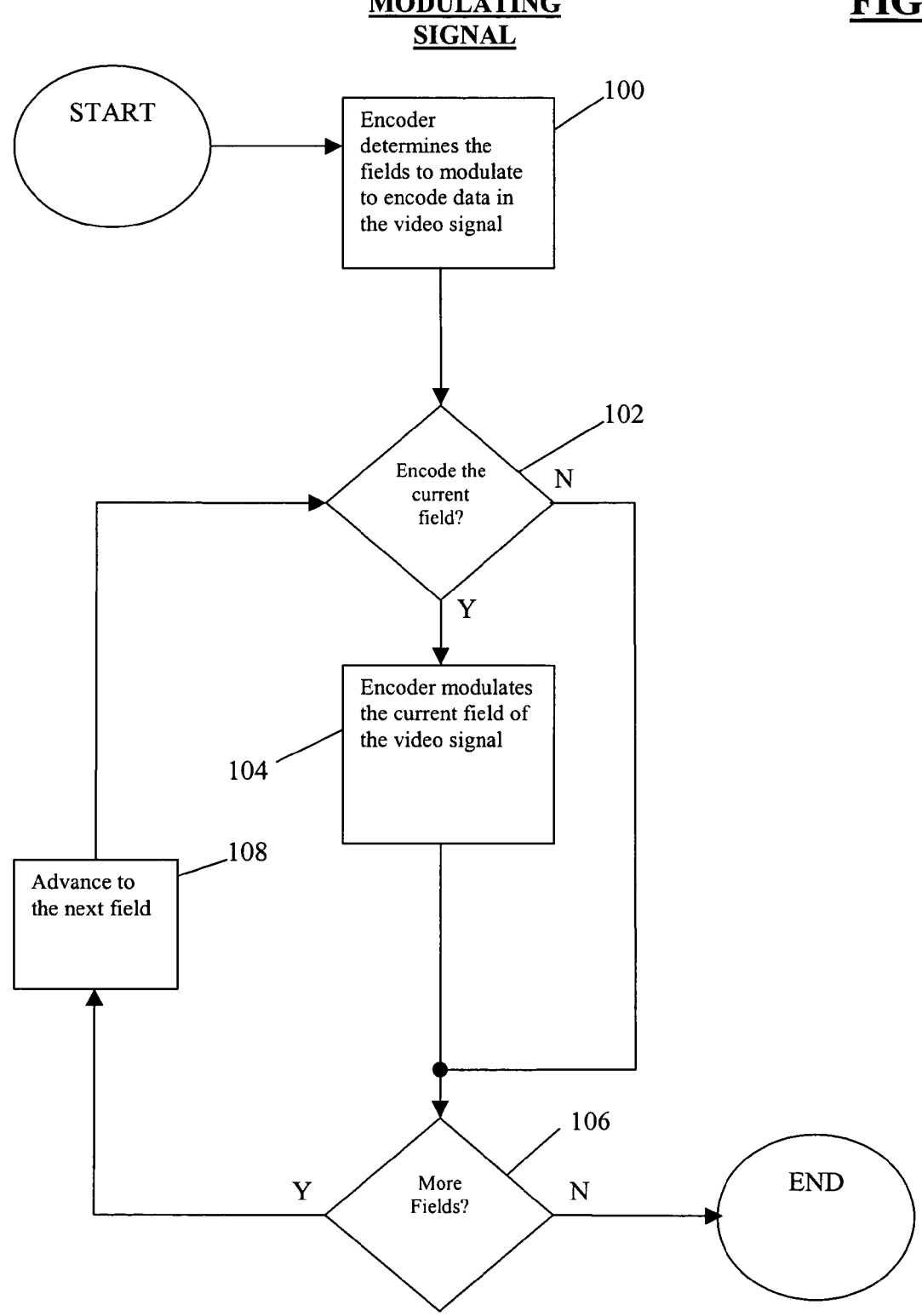
FIG. 9 is a flowchart of the modulating method of the present invention.

Referring to FIG. 9, the process of modulating video signal 18 comprises a first step 100 where encoder 12 determines which fields of video signal 18 to modulate so as to encode positional data 20 and supplemental data 21 within video signal 18. The process of which fields to modulate depends on the encoding scheme chosen with a particular embodiment of the present invention. In the preferred embodiment, the encoding scheme of Ciardullo is utilized to encode the fields of video signal 18 in a substantially invisible manner. However, it should be appreciated that other schemes for encoding data in video signal 18 may also be used with the present invention.

Encoder 12 at decision point 102 determines whether it is to encode the current field of video signal 18. If yes, encoder 12 at step 104 modulates the current field of video signal 18 so that it contains a carrier signal representing data and proceeds to decision point 106. If no, encoder 12 proceeds directly to decision point 106.

Encoder 12 at decision point 106 determines whether there are additional fields of video signal 18 left to encode. If yes, encoder 12 advances to the next field in video signal 18 at step 108 and thereafter returns to decision point 102. If no, the process of modulating video signal 18 is complete.

Figure 10:
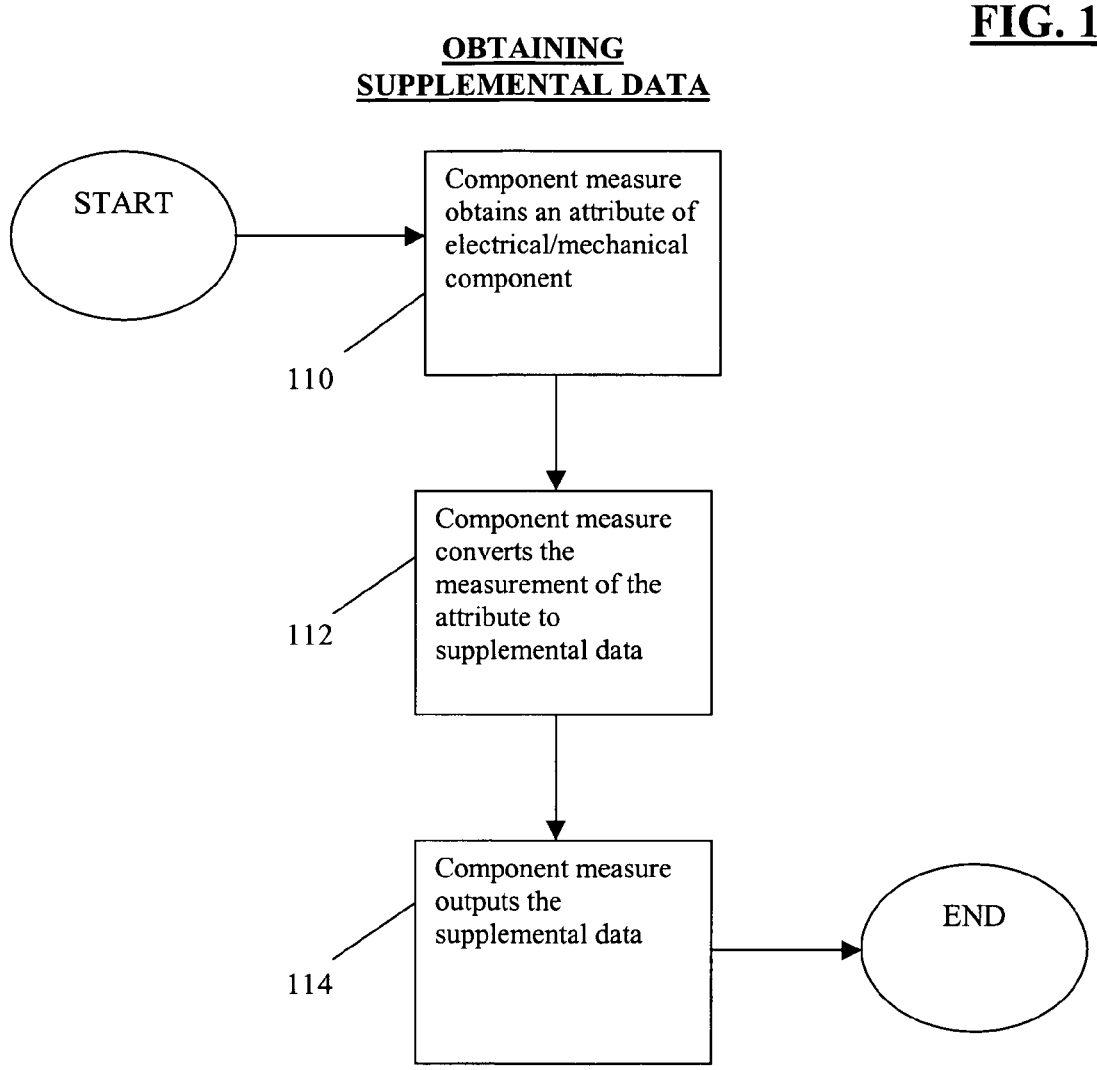
FIG. 10 is a flowchart of the method of obtaining supplemental data of the present invention.

Referring to FIG. 10, the method of obtaining supplemental data 21 from auxiliary source 11 is shown to comprise a first step 110 where component measure 82 obtains a reading of an attribute of electrical/mechanical component 80. Thereafter, component measure 82 at step 112 coverts the reading of the attribute into supplemental data 21, such that the reading may be used by the present invention. Component measure 82 transfers supplemental data 21 through data output 68 at step 114.

Figure 11:
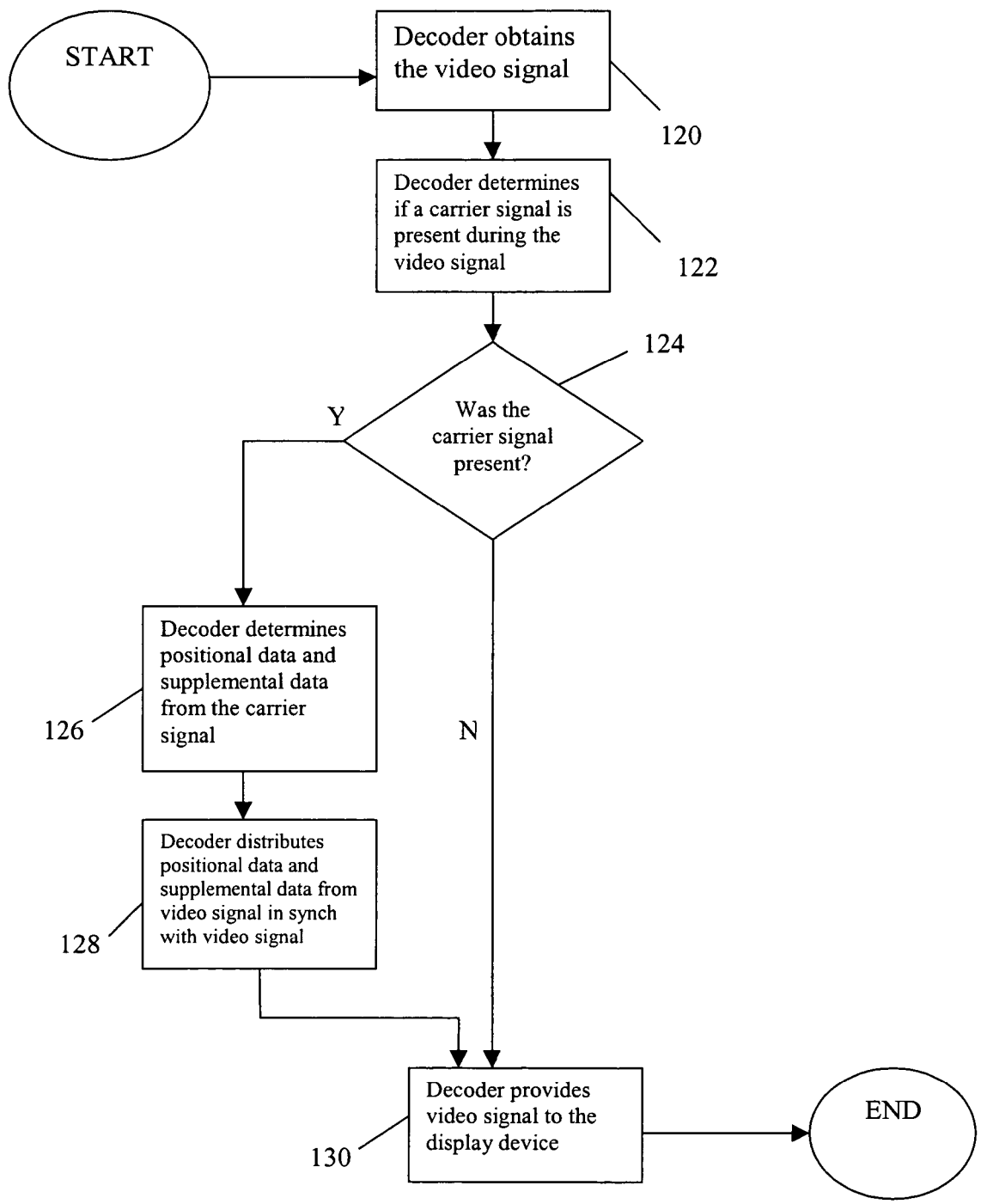
FIG. 11 is a flowchart of the decoding method of the present invention.

Referring to FIG. 11, the decoding method of the present invention is shown to first comprise a step 120 where decoder 13 obtains video signal 18 (i.e., modulated video signal 22) from recording medium 14 by playback unit 17. Thereafter, decoder 13 at step 122 reads video signal 18 to determine if a carrier signal is present within video signal 18 that reflects that data is present in video signal 18.

Decoder 13 at decision point 124 determines whether the carrier signal is present in video signal 18. If yes, decoder 13 obtains positional data 20 and supplemental data 21 from modulated video signal 22 at step 126. Decoder 13 then at step 128 distributes positional data 20 and supplemental data 21 to presentation device 24 and supplemental device 25 respectively in synchronization with modulated video signal 22. Thereafter, decoder 13 after decision point 124 or step 128 provides video signal 18 (or modulated video signal 22 if the carrier signal was present in video signal 18) to display device 26 at step 130.

It should be appreciated that other methods and technologies may also be utilized for encoding and decoding including VBI, Broughton and Withers II.

It should be understood from the foregoing that, while particular embodiments of the invention have been illustrated and described, various modifications can be made thereto without departing from the spirit and scope of the invention. Therefore, it is not intended that the invention be limited by the specification; instead, the scope of the present invention is intended to be limited only by the appended claims.

What is claimed is:

1. A method comprising:
    receiving a video signal from a video camera, the video signal depicting a recording subject;
    receiving positional data from a positioning receiver, the positional data being for a location of an object, the recording subject within view of the object; and
    encoding the positional data into a video portion of the video signal to produce a modulated video signal, the modulated video signal capable of being demodulated to present the video signal and the positional data.

2. The method of claim 1, wherein encoding the positional data into a video portion of the video signal to produce a modulated video signal comprises:
    modulating the video signal with the positional data by altering the luminance of the video signal.

3. The method of claim 1, wherein encoding the positional data into a video portion of the video signal to produce a modulated video signal comprises:
    modulating one or more frames of the video signal with the positional data in a substantially invisible manner.

4. The method of claim 1, wherein encoding the positional data into a video portion of the video signal to produce a modulated video signal comprises:
    selecting one or more fields of the video signal for modulation; and
    modulating one or more selected fields of the video signal with the positional data.

5. The method of claim 1, wherein receiving positional data from a positioning receiver further comprises receiving supplemental data regarding an aspect of the object from an auxiliary source; and
    wherein encoding the positional data into the video signal to produce a modulated video signal comprises encoding the positional data and the supplemental data into the video signal to produce a modulated video signal.

6. The method of claim 5, wherein the supplemental data is selected from a group of data comprising at least one of:
    a temperature of an engine,
    a speed of a vehicle, and
    a rotation of a camera lens.

7. The method of claim 1, further comprising:
    broadcasting the modulated video signal to a playback device.

8. The method of claim 1, further comprising:
    storing the modulated video signal on a recording medium.

9. The method of claim 8, wherein the recording medium is at least one of a VHS tape or a digital versatile disc (DVD).

10. The method of claim 1, wherein the object is a mobile object.

11. The method of claim 8, wherein the mobile object is an object selected from a group of objects consisting of a vehicle, a train, a tank, a watercraft, an airplane, a missile, and the video camera.

12. The method of claim 1, wherein the positional data is GPS location data.

13. A method comprising:
    accessing a modulated video signal, the modulated video signal including positional data encoded into a video portion of a video signal, the positional data being for a location of an object;
    decoding the modulated video signal to obtain the positional data; and
    presenting the modulated video signal for display and the positional data for reproduction.

14. The method of claim 13, wherein presenting the modulated video signal comprises:
    synchronously presenting the modulated video signal for display and depicting the location of the object on a map at a time the modulated video signal was recorded.

15. A method comprising:
    accessing a modulated video signal, the modulated video signal depicting a recording subject, the modulated video signal including positional data and supplemental data encoded into a video portion of a video signal, the positional data being for a location of an object, the supplemental data being supplemental information regarding the recording subject;
    decoding the modulated video signal to obtain the positional data and the supplemental data; and
    presenting the modulated video signal for display and the positional data and the supplemental data for reproduction.

16. The method of claim 15, wherein presenting comprises:
    synchronously presenting the modulated video signal for display and the supplemental data for reproduction, and depicting the location of the object on a map at a time the video signal was recorded.

17. A system comprising:
    a video camera to provide a video signal depicting a recording subject;

a positioning receiver to provide positional data on a location of an object, the recording subject within view of the object; and an encoder, the encoder to receive the video signal from the video camera and the positional data from the positioning receiver and modulate the video signal to include the positional data in a video portion of the video signal a substantially invisible way.

18. The system of claim 17, further comprising:

a video recorder to record the modulated video signal on a recording medium.

19. The system of claim 17, wherein the positioning receiver is in a fixed position on the object.

20. A machine-readable medium comprising instructions, which when executed by a machine, cause the machine to:

receive a video signal from a video camera, the video signal depicting a recording subject;

receive positional data from a positioning receiver, the positional data being for a location of an object, the recording subject within view of the object; and encode the positional data into a video portion of the video signal to produce a modulated video signal.

21. The machine-readable medium of claim 20 further comprising instructions, which when executed by a machine, cause the machine to:

store the modulated video signal on a recording medium.

22. The method of claim 13, wherein presenting comprises:

presenting the modulated video signal for display on a display device and the positional data for reproduction on a presentation device.

23. The method of claim 15, wherein presenting comprises:

presenting the modulated video signal for display on a display device, the positional data for reproduction on a presentation device, and the supplemental data for reproduction on a supplemental device.

* * * * *

UNITED STATES PATENT AND TRADEMARK OFFICE
CERTIFICATE OF CORRECTION

| | | |
|---|---|---|
| PATENT NO. | : 7,330,511 B2 | Page 1 of 1 |
| APPLICATION NO. | : 10/888292 | |
| DATED | : February 12, 2008 | |
| INVENTOR(S) | : Maltagliati et al. | |

It is certified that error appears in the above-identified patent and that said Letters Patent is hereby corrected as shown below:

In column 8, line 20, delete "electromechanical" and insert -- electro-mechanical --, therefor.

In column 8, line 23, delete "electromechanical" and insert -- electro-mechanical --, therefor.

In column 8, line 24, delete "electromechanical" and insert -- electro-mechanical --, therefor.

Signed and Sealed this

Ninth Day of September, 2008

JON W. DUDAS
*Director of the United States Patent and Trademark Office*